June 17, 1969 W. BESTER ET AL 3,450,836

PRINTING MACHINE IN A TRANSMISSION SYSTEM HAVING A PARITY STEP ADDED TO THE INFORMATION STEPS TO PROVIDE A SAFEGUARD AGAINST INTERFERENCES

Filed Oct. 22, 1965

Sheet 1 of 4

INVENTORS

WERNER BESTER, FRITZ BUTZKE, FRITZ HENNIG, SVEN VOELCKER RICHARD REIER & RUDOLF REKEWITZ

BY Spill & Hill ATTORNEYS

INVENTORS
WERNER BESTER, FRITZ BUTZKE, FRITZ HENNIG, SVEN VOELCKER, RICHARD REIER & RUDOLF REKEWITZ
BY Spill & Spill ATTORNEYS INVENTORS
WERNER BESTER, FRITZ BUTZKE,
FRITZ HENNIG, SVEN VOELCKER,
RICHARD REIER & RUDOLF REKEWITZ
BY Spiee & Spiee ATTORNEYS INVENTORS
WERNER BESTER, FRITZ BUTZKE,
FRITZ HENNIG, SVEN VOELCKER,
RICHARD REIER & RUDOLF REKEWITZ
BY [signature] ATTORNEYS 3,450,836

PRINTING MACHINE IN A TRANSMISSION SYSTEM HAVING A PARITY STEP ADDED TO THE INFORMATION STEPS TO PROVIDE A SAFEGUARD AGAINST INTERFERENCES

Werner Bester, Munich, Fritz Butzke, Baierbrunn-Buchenhain, Fritz Hennig, Munich-Solln, and Sven Voelcker, Richard Reier, and Rudolf Rekewitz, Munich, Germany, assignors to Siemens Aktiengesellschaft, a corporation of Germany Filed Oct. 22, 1965, Ser. No. 505,134
Claims priority, application Germany, Dec. 11, 1964, S 94,577
Int. Cl. H04l 15/34, 15/24
U.S. Cl. 178—23 10 Claims

ABSTRACT OF THE DISCLOSURE

Teletype transmission system in which a parity step is added to the information steps of each Teletype character. A parity member is associated with each series of selector members or code bars, and an electromagnet controlled by a signal current selectively moves the selector members to align the slots adjacent a selected message type lever, to accommodate operation of the type lever pull bar to print a character. The parity member is in alignment with the selector members and is controlled by a signal current and moves into position to block the pull bar from dropping into a selector member slot upon a signal designating an error. A leverage arrangement connected with the mechanism for operating the type lever pull rods is provided to effect the printing of an error mark. A leverage arrangement operated by an error signal is, also, provided to prevent the printing of a character in error.

*Summary and objects of the invention*

In carrying out the principles of the present invention, we increase the reliabilities of the safeguards for checking parity by providing a parity comparison member under the control of an adjusting means for the type carrier depending upon whether even-numbered or odd-numbered, for example, positive type of information steps, or the allocated setting combination of the adjusting machine is comparable with the position of a member adjustable by the received parity step, and by providing means to prevent the printing of the type character allocated to the received Teletype character in the case of nonagreement of the parity position of these two members or adjusting means. In this manner, the parity safeguard also protects the device for the translation of the receiver setting into the printer.

According to a further development of the invention, there is provided a parity member adjustable in the movement range of the adjusting means for the type levers depending upon the type of the received parity step, which is provided with lugs or recesses for hindering or releasing, respectively, with the initiation of operation of these adjusting means in a manner known per se.

According to another further development of the invention, means are provided to cause the printing of an error mark depending upon the suppression of the printing of a type character recognized as being incorrect. These means can be constructed so that the printing of the error mark takes place, without hesitation, immediately in place of the type character in question. A special emphasizing of this signal by color change is possible with use of a two-color writer of known design.

A principal object of the present invention, therefore, is to provide an improved Teletype system having a parity comparison step arranged with a view toward obviating the printing of characters in error in a simple and improved manner.

Another object of the present invention is to provide a novel and improved apparatus and system for increasing the safeguards in the parity checks for errors in Teletype machines by preventing the printing of the wrong character and by indicating the error.

A still further object of the invention is to add a parity step to the information steps of each Teletype character so arranged as to reduce the printing of characters in error to a minimum and to thereby increase the safety of the Teletype system.

These and other objects of the invention will appear from time to time as the following specification proceeds and with reference to the accompanying drawings wherein.

Figure 1:
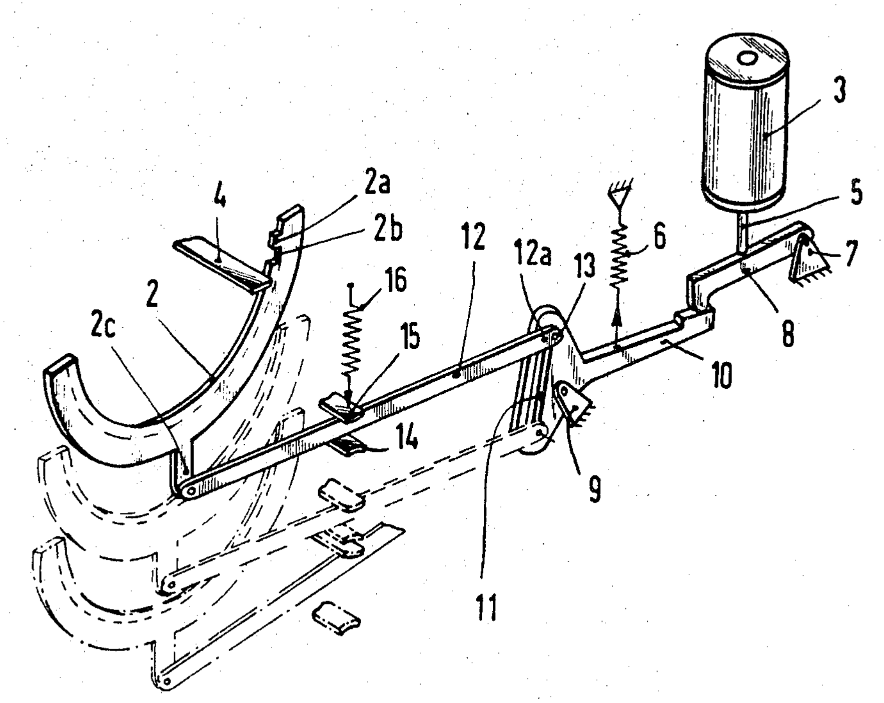
FIG. 1 shows an operating device for a parity member for preventing, when required, a selected pull rod of a type lever gear from dropping into position, which can occupy three elevational positions.

In a Teletype transmission having a parity step added to each character, it is desirable to be able to check whether not only the chosen allocation exists between the properly received Teletype steps and the parity step, but also that the reception transmission is carried out correctly with a high degree of probability. Accordingly, as shown in FIG. 1, after a comparison takes place between the combined position of selector members of a selector group reception translator and the position of a parity member 2, said parity member is adjustably movable upon the excitation of an electromagnet 3 into such a position that a pull rod 4 is released to drop into position in response to the associated selector or code bar members (not shown) and is prevented from dropping into position by a lug 2*a* of the parity segment 2 on detection of a parity error. On the other hand, the pull rod 4 will pass into a gap 2*b* between lugs 2*a* to initiate the printing of the type character that is recognized as correct.

The device according to FIG. 1 is suited, moreover, for Teletype machines equipped for at least triple shifting, and, accordingly for the setting of unmarked selector members and of the parity member 2 in three different elevational positions. There the steps 1 to 5 of each Teletype character select the type bar; the steps 6 and 7 determine the elevational position of the type basket with respect to the writing roller and thereby selects the type to be printed by a selected type lever.

Figure 7:
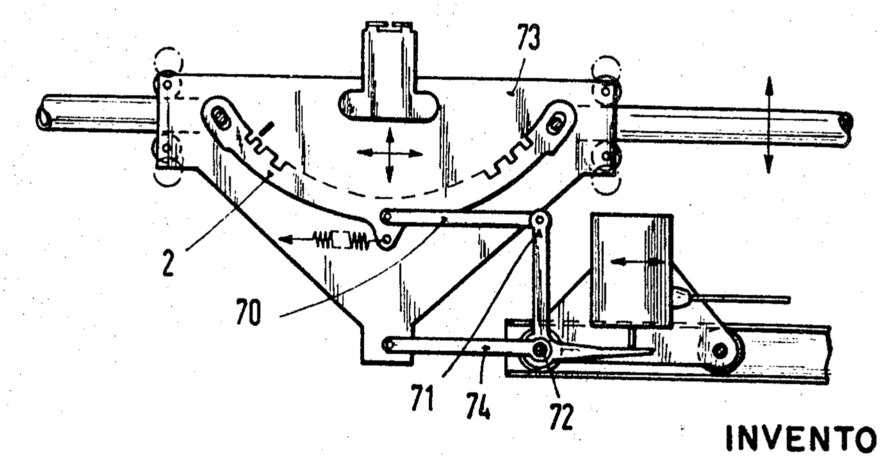
FIG. 7 shows an adjusting device for a parity member with compensating means.

In the drawing, it is assumed that the electromagnet 3 is energized and its armature plunged downward against the force of a spring 6. The armature 5 engages a lever 8 intermediate the ends of said lever and pivoted at point 7. Said lever 8 engages and shifts a T-shaped lever 10, pivotally mounted at 9 and restrained by the spring 6 maintaining the levers 8 and 10 in engagement with each other. The lever 10 has a shifting slide 11 for an operating rod 12. The right end 12a of said operating rod is connected to a bolt 13, guided in the slot 11. The left-hand end of said rod is pivotally connected to a lug tab 2c depending from the parity member 2. The inner carriage of the teletypewriter (not shown) is constructed as a carrier for the selector and parity members for the type levers, and is raisable and lowerable in type group change, and movable only along a straight line in the manner illustrated in FIGURE 7. A guide fork is carried by the carriage (not shown) and has engagement with opposite sides of the operating rod 12 and has a lower prong 14 fixedly connected with said carriage and underlying the rod 12. An upper prong 15 of the guide fork is biased into engagement with the upper side of the rod 12 by a compression spring 16. The electromagnet 3 and the bearing places 7 and 9 are arranged on the outer carriage of the teletypewriter, which is not vertically adjustable, as shown in FIGURE 7.

In the upper positions of the selector and parity members, drawn in solid lines, the bolt 13 of the operating rod 12 is in the upper end of the slide. The position of the parity member 2 represents a positive parity step (position "1") with magnet 3 energized, while both the middle position (drawn in broken lines) and also the lower position (drawn in dot-and-dash lines) represents a negative parity step (position "0") with magnet 3 energized. In the negative steps the right-hand end 12a of the operating rod 12 is shifted to the lower end of the slide 11. The slide 11, the operating rod 12 in its upper and its middle position, as well as the connecting line between the upper and middle position of the bearing point of the operating rod 12 on the tab 2c of the parity member 2 form a parallelogram. The operating rod 12 in its middle and its lower position and the connecting line between the middle and lower position of the bearing point of the operating rod 12 on the tap 2c of the parity member 2 form an isosceles triangle whose bisector runs horizontally through the lower end of the shifting slide 11. Thus, a distortion-free transmission of movement of the armature of the electromagnet 3 to the parity member 2 is provided when the bolt 13 is in its upper and lower positions in the shifting slide 11 and in all three segment positions of the selector and parity members, without further aid. In the lower position of the selector and parity members, the prong 14 has moved beneath the operating rod 12 and said rod is pressed down by the prong 15 and the spring 16.

As the electromagnet 3, is deenergized the lever 10 with the shifting slide 11 is swung counterclockwise by the spring 6 and the parity member 2 in each case occupies its opopsite position ("0" instead of "1" or vice versa). In this manner, for example, in a sevens-code with the eighth step as a parity step, the first five steps are covered by the position of the selector members (for example, segments) and the uneven-numbered or odd-numbered sum of the sixth and seventh steps are covered by the elevational positions of the selector members. Of the four possible combinations of these steps, only three come into consideration for the selection of the elevation of the type carrier for printing upper, lower or middle case letters. The fourth combination, for example "00," has to be suppressed in the printer, since this is occupied with 32 commands not to be printed. For the selection of the type cases to be printed, two odd-numbered and one even-numbered combination ("01" and "10" and "11") remain, corresponding to the example mentioned.

If the sum of the positive steps for the sixth and seventh steps is even, then the added parity step becomes negative in the case of an even number of positive steps of the first five teletype steps, and becomes positive in the case of an odd number. For the printing inhibit and release, respectively, therefore, the parity member 2 is merely added to the first five Teletype steps. This parity member blocks, depending on its position, that half of the type lever which is allocated to Teletype characters with an odd number of positive steps, or else that half of the type lever which is allocated to Teletype characters with an odd number of positive steps, or else that half of the type lever which is allocated to Teletype characters with an even number of positive steps.

If only one positive step is present in the group mentioned, consisting of the sixth and seventh steps, then the condition for the parity step is reversed. This means, that in this case also, the parity step is to be reversed in its influence on the printing of the type lever (not shown) selected by the first five steps. Thus, the parity member 2 blocks in its rest position the type levers which are allocated to an odd number of positive steps, and, in its working position, the type levers which are allocated to an even number of positive steps. The relation of the two positions of the parity member to the polarity of the parity step, therefore, is dependent on the number of positive steps in the group of the sixth and seventh Teletype step.

The above-mentioned reversal of the party step can also be achieved by the method that the evaluation of the type of the sixth and seventh Teletype step takes place electrically, for example, by position contacts of the type lever member. The energizing of the parity magnets may also be reversed in dependence on an electrical evaluation of the sixth and seventh step. Further, two alternately excitable parity electromagnets and two allocated selector members can be provided, each of which blocks one half of the type levers. The decision as to which of the two magnets is to be energized can be made by means of one of the last-mentioned devices.

In the case of simple printing prevention, without error marking, an intermediate space appears on the recording carrier for the sign recognized as false. In many cases, however, the marking of a character recognized as false is desirable, or at least of the line in which such a character occurs. This is even necessary in the transmission of numbers of an unknown number of places.

In order to assure that the marking can take place approximately simultaneously with the type-character printing, it is expedient to prepare the marking printing with each printer shaft expiration or the like and to interrupt this preparation in the case of characters not recognized as wrong, before the mark printing takes place.

It is possible to mark the zone in which the error lies, for example, by the method that on the margin of the line in question, i.e., the said error mark is set before the beginning or after the end of this line. The error mark may, however, directly take the place of the character recognized as being incorrect.

Figure 2:
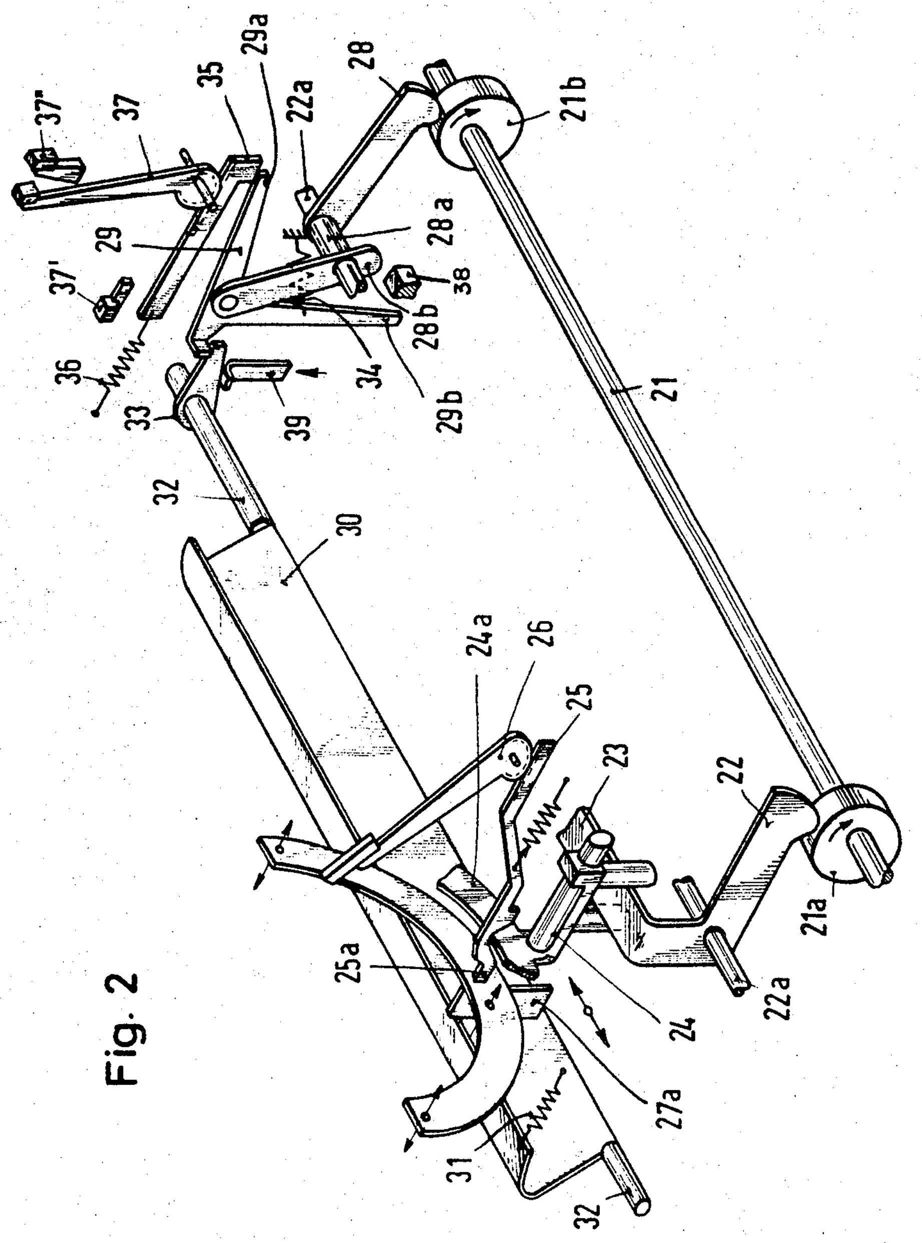
FIG. 2 shows a device for the operation and switching off of a parity error-mark printer.

An example of execution of the first-mentioned type of solution is represented in FIG. 2. This example can be combined with the device according to FIG. 1. It is assumed that a sheet teletypewriter is provided with a type-lever basket moving along a line which can be raised or lowered with the parity and selector members. A type lever 26 is drawn in a partly pulled position; all the others are omitted. In usual manner, a printer shaft 21 is provided. This shaft operates to rotatably drive an eccentric cam 21a, which rocks a transfer lever 22 about a pivot shaft 22a and a printer rocker arm 23 of said transfer lever 22. Said printer rocker arm is connected to a reciprocating pressure slide 24 having an operating member 24a for a pull rod 25 attached thereto and extending thereabove and shown as dropped into position. Operation of the pusher slide 24 brings about the printing stroke of the pull rod 25 and type lever 26 in a conventional manner, it being understood that the drive connection between the pull rod 25 and the type lever 26 may be a rack and pinion connection, as indicated by dotted lines in FIGURE 2. The selection of the pull rod takes place in known manner through selector members (not shown) which lie directly in front of the other shifting member 27 represented in FIG. 2. This shifting member 27 is thrust to the rear by the pull rod 25 that has dropped into place over the pull rod end 25a in the direction of the arrow.

The printing of a parity error mark on the margin (preferably by red marking) in front of the line concerned or also at the end of the line is prepared simultaneously with the preparation of the type printing by the means just mentioned. This is accomplished with the aid of a second eccentric cam 21b on the printer shaft 21, and a transfer lever 28 which is pivoted to the axle 22a for the lever 22 on a sleeve 28a, and is suitably connected with said sleeve. A second lever 28b is connected with the sleeve 28a and reciprocates a T-shaped intermediate lever 29 upon rotation of the cam 21b. If a pull rod 25 for the printing of script character types has dropped into position, then, regardless of the elevational setting of the members, a shift rocker 30 is swung on axle 32 against the force of a pull spring 31 over a lug 27a on the shifting member 27. A lever 33, secured to the axle 32, is rocked thereby to move the T-lever 29 against the force of another tension spring 34 and out of the movement range of a pull rod 35. This pull rod 35 is shown in FIG. 2 in its rest position and is operated on its printing stroke by a printer spring 36, and serves to actuate a printing hammer 37 for the printing of the parity error mark. The actuation of this printing hammer, of which its retracted position is indicated by reference numeral 37′ and its printing position is indicated by reference numeral 37″, is therefore normally only prepared, but not completed.

The cam 21b is diagrammatically illustrated in FIG. 2 and has a high position and a low position. In this figure, the lever 28 is engaging an intermediate portion of the cam and the lever 28 is in its rest position. As the cam rotates, the peak of the cam will pivot the lever 28 in a counterclockwise direction. This will move the pivot for the lever 29 to the left past the abutment of the pull rod 35. The spring 34 will simultaneously pivot the lever 29 in a counterclockwise direction into engagement with the abutment or shoulder of the pull rod 35.

If the printing of a character recognized as false is prevented by the parity member or in any other manner desired, then rotation of the cam 21b to engage the end of the lever 28 with the low part (not shown) of the cam 21b will cause rotation of the lever 28 in a clockwise direction and bodily move the lever 29 to the right, and thereby move the pull rod 35 in the same direction. This will take up tension on the spring 36 and move the type lever 37 towards its prepared position 37′. Continued bodily movement of the lever 29 to the right will engage the lever arm 29b with the stop 38. As movement of the lever 29 continues to the right, the stop 38 will react against the lever arm 29b of said lever and effect movement of said lever about its pivot in a clockwise direction and release the lever arm 29a from the abutment shoulder on the pull rod 35. The spring 36 will then move the pull rod 35 in a direction to pivot the print hammer 37 into its printing position designated by numeral 37″.

In the regular reception of a special-function Teletype character as represented in FIG. 2, the intermediate lever 29 is held by a pusher 39, over the lever 33, in the position shown in the drawing outside the movement range of the pull rod 35. A signal evaluation must be provided in known manner upon reception of such characters not to be printed, and, possibly, a separate monitoring of the parity condition. If, as assumed for the machine described, the printer drive is running constantly, it is possible with its aid to also register a parity error on the sheet within the non-printing command signal.

Within the scope of the invention, it is also possible to draw upon the printer shaft for the parity error marking, instead of the printing slide. Similar drive means are usable in the case of a paper carriage moveable in the line.

As a consequence of the printing prevention in the case of wrong evaluation, by the means explained, an interspace on the printed sheet is produced and an error mark at the beginning of the line or end of the line. It is not possible, therefore, to distinguish between a true interspace and an interspace which has resulted through an incorrect sign. The marked line must be repeated for correction.

Figure 3:
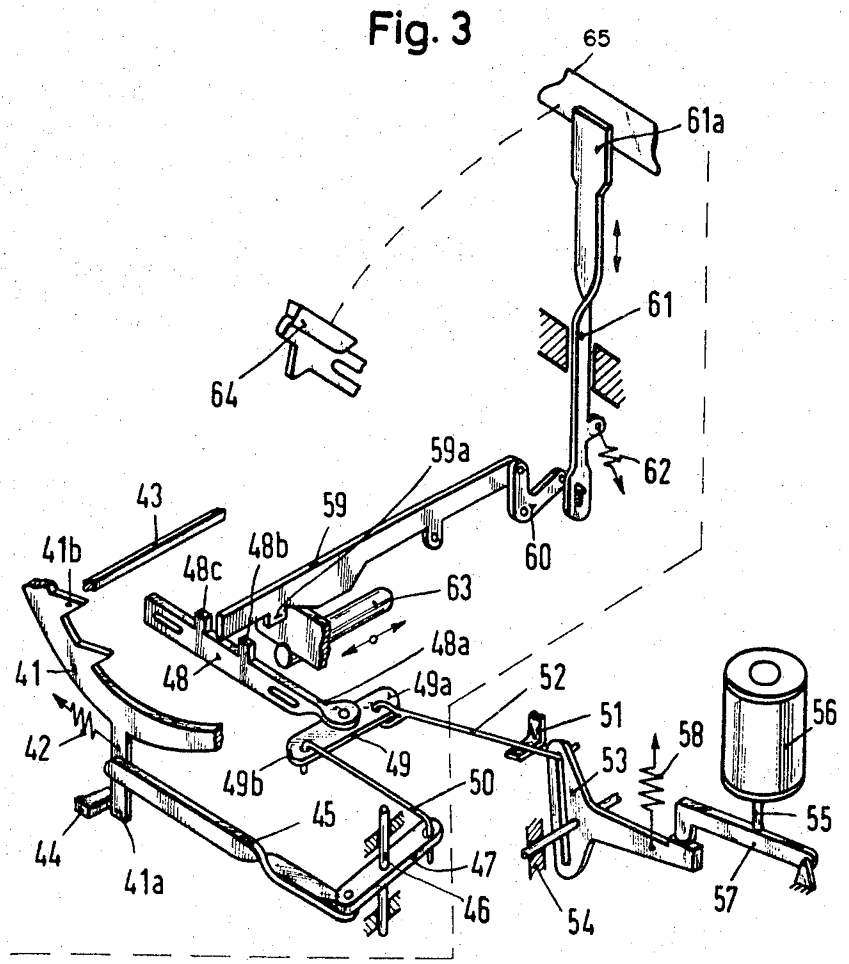
FIG. 3 shows an electro-mechanical comparison device for parity steps in connection with a device of different type for the operation and switching off a parity error mark printer.
Figure 4:
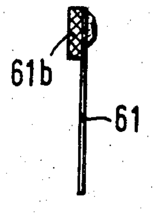
FIG. 4 shows a detail of the pusher preventing the printing of an incorrect type character.
Figure 5:
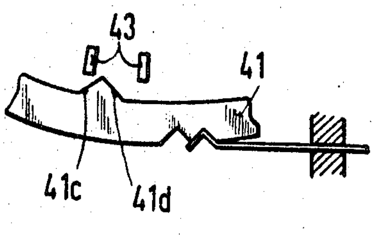
FIG. 5 shows a variation of the construction of the parity member according to FIG. 3.

FIGS. 3 to 5 show a form of operation that enables the printed characters to be evaluated as incorrect at the proper printing place on the recording carriers. There, also temporally viewed, the error character is printed instead of the correct character. The special functions lead to a marking only if either the sixth or the seventh step after "1" is printed incorrectly.

Figure 6:
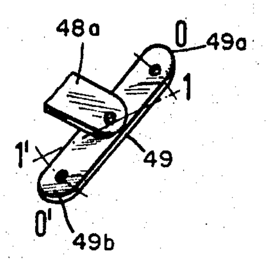
FIG. 6 shows the possible positions of the lever 49 according to FIG. 3.

FIG. 3 shows a type lever drive system with a type lever basket (not shown) that can be raised or lowered. A parity member 41 is shown which is positioned against the force of a spring 42 to block operation of a drop-in pull rod 43 by a lug 41b, of said parity member. In the rest position shown in the drawing, which corresponds to an odd number of positive steps in the received character, the member 41 lies with its lug 41a against a stop 44. The lug 41 is connected to a coupling link 45, which in turn is vertically pivoted to a deflection lever 47, pivotally mounted intermediate its ends on the type lever member carriage on pivot pins 46. In the elevationally shiftable part of the said carriage, a blocking bar 48 has an end 48a movably connected with the middle portion of the scale-beam-type lever 49. The scale-beam-type lever 49 is connected at one end with a control wire 50 pivoted to the opposite end of the lever 47 from the link 45. The type lever member (not shown) acts, according to its elevational position, with height adjusting effect with its lug 51 on the right end of a second control wire 52, which connects the end 49a of lever 49 with a slide lever 53. This lever is similar to lever 10 of FIG. 1, and is rotatably mounted at 54. An armature 55 of an electromagnet 56, which is controllable by parity pulses, drives a lever 57 in opposition to the force of a spring 58, downwardly upon excitation of the electromagnet, thereby rotating the lever 53 on the axle 54, so that the lever end 49a passes out of the position "0" into the position "1" as shown in FIG. 6 of the drawing.

As shown in FIG. 3, the pull rod 59, which is capable of shifting upwardly with a deflection lever 60 and therefore shifts an auxiliary-type pusher 61 against the force of a spring 62, lies between two lugs 48b and 48c of the blocking rail 48. In the energized position of armature 55 (position "1" of the lever end 49a), the lug 48c moves under the pull rod 59.

A corresponding situation results when the magnet 56 is de-energized. The lever end 49a is in position "0" and, as a result of the upwardly movement of a pull rod 43 on a beveled lug 41b of the parity member, the lever end 49b is displaced further to the left and the lug 48b moves under the pull rod 59. If the printing pusher 63 is displaced to the left (forward), in one of these two positions, then it cannot reach the lug 59a of the pull rod 59. In this case the selected type character is printed by the type lever 64. In the middle position of the blocking bar 48 (shown in the drawing), on the other hand, the desired positions belonging together of the parity member 41 and of the magnet armature 55 do not agree. For example, in the desired position "0′" of the lever end 49b and the undesirable position "0" of the lever end 49a, the printing pusher 63 can engage the pull rod 59 and push the auxiliary type pusher 61 with its free end constructed as shield 61 upwardly between the head of the type lever 64 and the ink ribbon 65 in front of the writing place. The type lever 64 is effective in this case as a printing hammer and causes the printing of the auxiliary type arranged on the shield 61*a* in the correct printing place.

A special print symbol, for example *x*, can be used as an error mark. The shield 61*a* is preferably lined with elastic material at the striking place 61*b* of the type lever against the shield 61*a* for the protection of the type on the type lever. The shield 61*a* and a major portion of the pusher 61 can, according to FIG. 4, be constructed as leaf springs. The possible positions of the lever 49 are represented separately in FIG. 6.

Instead of the parity member with lugs 41*b* beveled on one side according to FIG. 3, there can also be provided such a member according to FIG. 5 with bevelings 41*c* and 41*d* on different sides, and a rest each for even and odd parity special steps.

If, as in most Teletype machines in the past, the type group change between two type groups takes place with the aid of special Teletype characters, then a parity member displacement is readily possible. If, on the other hand, three or more type groups to be used selectively, for example in connection with writing underlayers that are not shiftable vertically, with one for Latin and another for Cyrillic alpha characters and also digits and characters as third type group, then the problem exists in the case of elevation displacement of the parity segment 2, of assuring an exactly constant angular displacement with maintenance of the absolute spacings of, for example, a vertical line through the midpoint of the member by a lever engaging, for example, tangentially. This is accomplished in the manner shown and described in Patent No. 3,374,847, which issued to Rudolf Rekewitz and Richard Reier on Mar. 26, 1968, and is no part of our present invention so need not be described in detail herein.

In FIG. 7 a rectangular lever 71 displacing the coupling lever 70 with its pivot axis 72 parallel to the middle angular position of the coupling lever 70 is slidable in type group change with respect to the selector member carrier 73. The selector member carrier 73 shifts perpendicularly to the line direction, and a second coupling lever 74 is connected parallel to the first and movable with the selector member carrier proceeding from the pivot axis 72 so that a parallel guide is thereby formed for the angle lever. In this manner it is possible to guide the coupling lever at its end away from the selector segment in a structural part which does not participate in the vertical movement of the selector segments.

Figure 8:
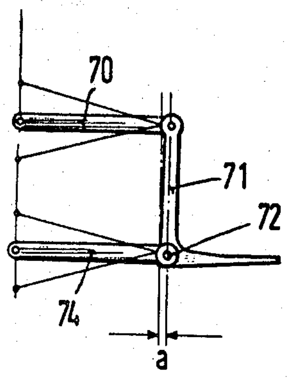
FIG. 8 shows a diagram of the principles of the compensating device.

In FIG. 8 the manner of operation of this device is schematically represented. There, again, the position of the levers 70, 71 and 74 is drawn in solid lines in the middle elevational position of the members. The position of levers 70 and 74 in the case of members shifted upward or downward is indicated by thin lines. The midline of the arm connecting levers 70 and 74, of angle lever 71, is indicated in dot and dash lines. The deflection amount is designated with *a*.

Changes may be made within the scope and spirit of the appended claims which define what is believed to be new and desired to have protected by Letters Patent.

What is claimed is:

1. In a Teletype transmission system having a parity step in addition to the information steps of each Teletype character, to safeguard against interferences,
a type arm pull bar,
a parity member having a series of equally spaced lugs with gaps between said lugs,
said parity member being movable into position to accommodate said pull bar to move into a selected gap into an operating position and into another position to block movement of said pull bar by one of said lugs to prevent the printing of a type character allocated to a received Teletype signal,
a type lever actuated by said pull bar,
means biasing said parity member into one position, electromagnetic means moving said parity member into another position against said biasing means, and
a member actuated by said electromagnetic means and moved into position to prevent the printing by said type lever of a type character recognized as being incorrect.

2. A Teletype machine in accordance with claim 1, wherein said member for preventing the printing of a type character recognized as being incorrect includes a shield movable in front of said type lever when in its printing position.

3. A Teletype machine according to claim 2, wherein said shield has an error mark type thereon and is engaged by said type lever to effect the printing of said error mark type.

4. A Teletype machine according to claim 3, wherein the member and shield are a leaf spring and have an elastic striking face on one side and an error print symbol on the opposite side for printing an error mark.

5. A Teletype machine in accordance with claim 1, wherein the lugs have opposite inclined faces converging toward a peak, and
wherein detent means index the parity member for even and odd parity steps.

6. A Teletype machine according to claim 1, wherein the member for preventing the printing of a type character recognized as incorrect is vertically movable and has a shield as a part thereof, moved into and out of registry with the type lever,
wherein spring means bias said shield out of registry with the type lever,
wherein a pull rod is provided to actuate said shield,
wherein a blocking bar is provided to prevent actuation of said pull rod to accommodate the printing of a correct type character by said type lever, and
wherein the means for actuating said pull rod comprises a lever pivotally connected to said blocking bar intermediate its ends, a link actuated by said electromagnet and connected with said lever at one end thereof, a second link connected to said lever at the opposite end thereof and having operative connection with said parity member to effect operation thereof upon energizing of said electromagnet, said two links reacting against opposite ends of said lever and moving said blocking bar into position to block operation of said pull rod upon the positioning of said parity member to accommodate the printing of a type character and movable into position to accommodate the blocking of the printing of a type character upon the positioning of said parity member to prevent the printing of a type character allocated to a received Teletype signal.

7. In a Teletype machine transmission system having a parity step in addition to the information steps of each Teletype character to provide a safeguard against interferences,
a pull bar,
a type lever actuated by said pull bar,
a parity member shiftable vertically into more than two vertical shift positions,
said parity member being in the form of the segment of a circle and having a series of equally spaced lugs and gaps between said lugs on one circular face of said parity member and being adjustable along the arc of a circle into position to block movement of said pull bar to prevent the printing of a type character allocated to a Teletype received signal recognized as incorrect,
means biasing said parity member into one position,
actuating means arcuately moving said parity member into another position,
said actuating means including an electromagnet,
a lever pivoted intermediate its ends and having one end operated by said electromagnet and an opposite end having a vertically extending slide therein, a coupling link actuated by said lever and adjustably movable along said slide, and means controlling the position of said coupling link along said slide in accordance with the vertical position of adjustment of said parity member to maintain a generally tangential pull between said coupling link and parity member in all vertical positions of adjustment of said parity member relative to said slide.

8. A Teletype machine according to claim 7, wherein the means controlling the position of said coupling link along said slide comprises a vertically movable fork engaging said coupling link and having one prong underlying said coupling link and vertically moved with said parity member and a second prong biased into engagement with the upper side of said coupling link.

9. A Teletype machine in accordance with claim 7, including, an error printing hammer for printing a parity error mark, a pull rod for actuating said hammer, spring means for moving said pull rod on its printing strokes, an abutment on said pull rod, a first lever having an arm engageable with said abutment, a spring biasing said first lever and arm in a direction to engage said abutment, a second lever, a shaft forming a pivotal mounting for said second lever, a pivot pin pivoting said first lever to said second lever, and forming a movable pivotal mounting for said first lever, cam and follower means moving said second lever about said shaft and moving the pivot of said first lever in a retractable direction to accommodate said arm to move into engagement with said abutment by the bias of said spring, and then moving said arm in a direction to take up on the tension of said spring means for actuating said pull rod, said first lever having a second arm extending from said pivot pin, and a stop engaged by said second arm upon the placing of a predetermined tension on said spring actuating means for said pull rod and releasing said arm of said first lever from said abutment to effect movement of said error printing hammer on its printing stroke to print an error mark.

10. A Teletype machine in accordance with claim 9, including, a shift rocker having at least one shaft extending therefrom, a lever on said shaft engaging said first lever and normally holding said first lever in position to position said arm out of range to engage said abutment, and spring means pivoting said shift rocker and shaft into position to accommodate said arm of said first lever to engage said abutment upon the occurrence of a parity error.

References Cited

UNITED STATES PATENTS

| | | | |
|---|---|---|---|
| 2,508,554 | 5/1950 | Warwick ____________ | 178—23 |
| 2,657,261 | 10/1953 | Rea ______________ | 178—23 |
| 2,938,952 | 5/1960 | Roggenstein _________ | 178—23 |

THOMAS A. ROBINSON, *Primary Examiner.*

U.S. Cl. X.R.

178—25